(12) United States Patent
Terho et al.

(10) Patent No.: US 10,481,994 B2
(45) Date of Patent: Nov. 19, 2019

(54) METHOD AND APPARATUS FOR CLASSIFYING VIRTUAL ACTIVITIES OF MOBILE USERS

(71) Applicant: Huawei Technologies Co., Ltd., Shenzhen (CN)

(72) Inventors: Mikko Terho, Kista (SE); Basel Magableh, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 15/823,141

(22) Filed: Nov. 27, 2017

(65) Prior Publication Data

US 2018/0081778 A1    Mar. 22, 2018

Related U.S. Application Data

(63) Continuation of application No. PCT/CN2016/085744, filed on Jun. 14, 2016.

(30) Foreign Application Priority Data

Jun. 16, 2015 (EP) .................................. EP15172355

(51) Int. Cl.
*G06F 15/173* (2006.01)
*G06F 11/34* (2006.01)
(Continued)

(52) U.S. Cl.
CPC .......... *G06F 11/3438* (2013.01); *G06F 9/542* (2013.01); *G06F 16/13* (2019.01);
(Continued)

(58) Field of Classification Search
CPC .. G06F 11/3438; G06F 16/9535; G06F 16/13; G06F 9/542; G06F 16/328; H04W 4/38; G06N 5/02

See application file for complete search history.

(56) References Cited

U.S. PATENT DOCUMENTS

| 8,522,258 B1 | 8/2013 | Shaw |
| 2006/0247915 A1 | 11/2006 | Bradford et al. |

(Continued)

FOREIGN PATENT DOCUMENTS

| CN | 102111877 A | 6/2011 |
| CN | 103533158 A | 1/2014 |

(Continued)

OTHER PUBLICATIONS

Machine Translation and Abstract of Chinese Publication No. CN102111877, Jun. 29, 2011, 24 pages.

(Continued)

*Primary Examiner* — John B Walsh
(74) *Attorney, Agent, or Firm* — Conley Rose, P.C.

(57) ABSTRACT

A mobile computing apparatus including a processor wherein the processor is configured to host a set of one or more applications. The processor is configured to receive a message from a first application in the hosted set of one or more applications, wherein the received message indicates a user action. The processor determines if the user action is in a predetermined set of user actions, and when the user action is in the predetermined set of user actions, an intercepted message is created comprising a copy of the received message. The processor is configured to broadcast the intercepted message to one or more applications in the set of hosted applications that are configured to receive the intercepted message.

20 Claims, 9 Drawing Sheets

(51) Int. Cl.
- *G06F 16/13* (2019.01)
- *G06F 16/9535* (2019.01)
- *G06F 9/54* (2006.01)
- *H04W 4/38* (2018.01)
- *G06N 5/02* (2006.01)
- *G06F 16/31* (2019.01)

(52) U.S. Cl.
CPC ........... *G06F 16/9535* (2019.01); *G06N 5/02* (2013.01); *H04W 4/38* (2018.02); *G06F 16/328* (2019.01)

(56) References Cited

U.S. PATENT DOCUMENTS

| | | |
|---|---|---|
| 2007/0282954 A1 | 12/2007 | Kim et al. |
| 2010/0287566 A1 | 11/2010 | Hauser |
| 2013/0159220 A1 | 6/2013 | Winn et al. |
| 2014/0007010 A1 | 1/2014 | Blom |
| 2014/0128105 A1* | 5/2014 | Su .................... H04W 4/021 455/456.3 |
| 2014/0157288 A1 | 6/2014 | Wong |
| 2014/0164750 A1 | 6/2014 | Tang et al. |
| 2014/0195934 A1* | 7/2014 | Harrison ............... H04L 12/189 715/758 |
| 2014/0215495 A1* | 7/2014 | Erich .................. G06F 11/3438 719/318 |
| 2015/0269937 A1 | 9/2015 | Jitkoff et al. |

FOREIGN PATENT DOCUMENTS

| | | |
|---|---|---|
| CN | 104123360 A | 10/2014 |
| CN | 104182232 A | 12/2014 |
| EP | 1280080 A1 | 1/2003 |
| EP | 3142005 A1 | 3/2017 |
| KR | 20090025301 A | 3/2009 |
| KR | 20130101505 A | 9/2013 |

OTHER PUBLICATIONS

Machine Translation and Abstract of Chinese Publication No. CN104123360, Oct. 29, 2014, 24 pages.
Foreign Communication From a Counterpart Application, Chinese Application No. 201680004175.7, Chinese Search Report dated Apr. 25, 2019, 3 pages.
Foreign Communication From a Counterpart Application, Chinese Application No. 201680004175.7, Chinese Office Action dated May 8, 2019, 5 pages.
Nadeau, D., et al., "A survey of named entity recognition and classification," LingvisticD Investigationes 30:1, 2007, pp. 3-26.
Wu, G., et al., "M2M: From Mobile to Embedded Internet," IEEE Communications Magazine, Apr. 2011, pp. 36-43.
Sahlgren, M., et al., "Using Bag-of-Concepts to Improve the Performance of Support Vector Machines in Text Categorization," 2004, 7 pages.
Foreign Communication From a Counterpart Application, European Application No. 15172355.8, Extended European Search Report dated Dec. 14, 2015, 8 pages.
Foreign Communication From a Counterpart Application, PCT Application No. PCT/CN2016/085744, English Translation of International Search Report dated Aug. 31, 2016, 4 pages.
Foreign Communication From a Counterpart Application, Korean Application No. 10-2018-7001138, Korean Office Action dated Jan. 9, 2019, 6 pages.
Foreign Communication From a Counterpart Application, Korean Application No. 10-2018-7001138, English Translation of Korean Office Action dated Jan. 9, 2019, 4 pages.
Foreign Communication From a Counterpart Application, Korean Application No. 2019-049951813, Korean Notice of Allowance dated Jul. 11, 2019, 2 pages.

* cited by examiner

METHOD AND APPARATUS FOR CLASSIFYING VIRTUAL ACTIVITIES OF MOBILE USERS

CROSS-REFERENCE TO RELATED APPLICATIONS

This application is a continuation of International Application No. PCT/CN2016/085744, filed on Jun. 14, 2016, which claims priority to European Patent Application No. EP15172355.8, filed on Jun. 16, 2015. The disclosures of the aforementioned applications are hereby incorporated by reference in their entireties.

TECHNICAL FIELD

The aspects of the present disclosure relate generally to mobile communication devices and in particular to smart mobile operating systems and activity aware computing.

BACKGROUND

In recent years wireless devices have evolved from basic mobile phones providing simple voice and texting functionality into powerful mobile computing devices, also referred to herein as mobile devices or just devices, such as smart phones, tablets or phablets. These mobile devices provide a wide range of powerful software applications in different areas including communications, internet, entertainment, banking, and personal fitness.

Modern mobile computing devices come equipped with highly evolved mobile operating systems (OS) such as the ANDROID OS currently developed by GOOGLE, the IPHONE OS (IOS) developed by APPLE, as well as many others. The producers of mobile operating systems and mobile devices provide low cost or free development chains along with thorough documentation making it easy for nearly anyone to develop and distribute high quality software application to mobile devices worldwide.

These mobile devices also come equipped with various interfaces and sensors, such as radio transceivers, global positioning system interfaces, accelerometers, and cameras that not only provide a broad range of functionality, but also allow software applications running on the mobile device to gather information about a user's activities. As a result of the proliferation of available software applications and the intelligence being built into these software applications, people are spending greater amounts of time using and integrating their mobile devices into their daily lives. Because of this increasing time and reliance on mobile devices, it is believed by many that the future of mobile computing lies in the ability of mobile software to be smarter and more intelligent and to provide the user with a personalized service tailored to their activities, tasks, and needs.

A current trend in mobile software development is to improve the user experience by adding activity awareness in applications. Activity awareness refers to the ability of an application to monitor user activities. These activities include both physical activities such as walking or driving, as well as activities done on the mobile device, referred to herein as virtual activities. Virtual activities can include, but are not limited to reading, email or texting.

Activity awareness has inspired novel approaches toward service and application development spawning new solutions in surveillance, emergency response, and military fields. Mobile software that recognizes human activities opens the door to a world of healthcare applications such as fitness monitoring, eldercare support, long-term preventive and chronic care, and cognitive assistance. For example personal fitness applications use real-time activity information to encourage users to perform sports activities, or to track workouts.

An important aspect of activity awareness in mobile applications is the ability to classify activities a user performs in the mobile environment. Useful classification requires a high level of awareness of mobile user activities and a deeper knowledge about the user interaction with software applications running within the mobile environment. Monitoring activities at the application level can include analyzing usage of one particular software application or tracking the most visited area in a user interface (UI) of an application. However, merely analyzing usage or tracking the most visited areas is not suitable for capturing the broad usage information necessary to provide deeper awareness of user behavior and virtual activities that is necessary to provide a truly personalized mobile computing environment. Further, merely capturing activities at the application level cannot provide the type of structured data necessary to clearly describe the actions of a user, the data in use, and the source or target application, or software component.

Recognition and classification of a mobile user's activities is of interest to a wide range of disciplines and can be grouped into two basic categories. End user activity recognition focusses on detecting the end user's virtual or physical activities. Activity-based social networking focusses on detecting and analyzing a user's interests and preferences based on analyzing their social networking activity. End user applications are available that detect the user's activities, however, the type of information these applications can collect is limited to information such as the most used applications, lists of installed/downloaded applications, or understanding the users most frequent communications via email, text messaging, and phone calls. Because of the limited amount of information obtained by these end user applications, they cannot provide a concrete detection of the user's virtual activities.

For example, an end user application, such as an email application developed to run on the ANDROID OS, brings together various items like to-do lists, received and sent emails, and email attachments into a single contextual inbox. The contextual inbox is designed to be a well-organized email inbox that organizes the listed emails based on the context of the email subject, body, and attachments. This enables users to organize emails based on subject or contextual attachments and provides for the creation of smart folders based on search results. Operating system providers are also beginning to provide analytics capabilities in software development kits (SDK) allowing software developers to easily build activity awareness and other intelligence into their applications. However, these application level SDKs require that the activity awareness be built into every application and cannot be retrofit into existing applications without redesign at the source code level. Also, without close coordination among application developers, who may be from different companies and geographic locations, the information gathered pertains to only the individual applications and does not allow monitoring of inter application activity patterns and dependencies.

Thus, there is a need for improved apparatus and methods for enabling activity awareness in mobile computing devices.

SUMMARY

It is an object of the present invention to provide methods and apparatus to enhance the experience presented to users of mobile computing devices.

This is achieved by providing improved monitoring of the user's virtual and physical activities. The improved monitoring supports intelligent activity aware applications.

The foregoing and other objects are achieved by the features of the independent claims. Further implementation forms are apparent from the dependent claims, the description and the figures.

According to a first aspect of the present invention the above and further objects and advantages are obtained by an apparatus (such as a mobile computing device or a mobile communication device) including a processor. The processor is configured to host a set of one or more applications, receive a message from a first application in the hosted set of one or more applications, wherein the received message indicates a user action. The processor is configured to determine if the user action is in a predetermined set of user actions, and when the user action is in the predetermined set of user actions, create an intercepted message comprising a copy of the received message. The processor is configured to broadcast the intercepted message to one or more applications in the set of hosted applications that are configured to receive the intercepted message.

By intercepting messages provided by applications and broadcasting intercepted messages to applications interested in such intercepted messages an improved monitoring of a user's virtual activities can be achieved and accordingly a user experience can be enriched by providing these intercepted messages to activity aware applications. Furthermore, the described concept can be implemented without any change to existing application creating such messages.

In a first possible implementation form of the apparatus according to the first aspect the processor is configured to create the intercepted message by formatting the received message as a set of key-value pairs.

Formatting the received messages as key value pairs allows applications consuming the messages to quickly and easily locate information of interest within the received message.

In a second possible implementation form of the apparatus according to the first aspect as such or to the first possible implementation form of the first aspect the set of key-value pairs comprises a received message data, a received message action, a received message data type, a received message sender, and a received message activity.

Using a standard set of key-value pairs enables activity aware applications to advantageously consume messages from activities not considered during design of the activity aware application.

In a third possible implementation form of the apparatus according to the first aspect as such or to the first or second possible implementation forms of the first aspect the processor is configured to append a predetermined category and a predetermined action to the intercepted message.

By assigning a predetermined action and predetermined category to each intercepted message an activity aware application can intercept interesting messages originating from all applications running on a device by simply registering for one predetermined action or predetermined category.

In a fourth possible implementation form of the apparatus according to the first aspect as such or to any of the first through third possible implementation forms of the first aspect the processor is configured to append sensor data to the intercepted message, wherein the sensor data comprises at least one of a timestamp and a location.

The timestamp and location are of special interest to activity aware applications because they provide a basis for determining a user's physical activities as well as virtual activities.

In a fifth possible implementation form of the apparatus according to the first aspect or to any of the preceding first through fourth possible implementation forms of the first aspect the processor comprises an operating system and the processor is configured to receive one or more intercepted messages from the operating system, and to read sensor data corresponding to the one or more received intercepted messages, wherein the sensor data comprises at least one of a timestamp and a location. The processor is configured to determine context information based on the received one or more intercepted messages and the sensor data, and append the context information to the one or more received intercepted messages.

Assigning context information directly to each intercepted message provides a more comprehensive picture of what a user is doing both within the mobile software applications as well as in the physical world.

In a sixth possible implementation form of the apparatus according to the first aspect as such or to the fifth possible implementation form of the first aspect the context information comprises at least one of a time period, a map region, a physical activity, and a virtual activity.

Incorporating abstract concepts such as time period, map region, and physical activity into the context information provides a consuming application with higher level information that can be used to provide improved customizations and targeted functionality.

In a seventh possible implementation form of the apparatus according to the first aspect as such or to fifth or sixth possible implementation forms of the first aspect the processor is configured to determine, using a random indexing algorithm, a set of predicted user actions based on the context information and the one or more received intercepted messages.

Providing a set of predicted user actions provides a user with easily accessible shortcuts so they can quickly access the functionality they are most likely to desire at any given time.

In an eighth possible implementation form of the apparatus according to the first aspect as such or to any of the preceding fifth through seventh possible implementation forms of the first aspect the context information comprises one or more context conditions, and wherein each context condition comprises a finite set of categories, and the processor is configured to classify each context condition based on the sensor data and the one or more intercepted messages.

In a ninth possible implementation form of the apparatus according to the first aspect as such or to any of the preceding first through eighth possible implementation forms of the first aspect the processor is configured to retrieve and append additional information to the intercepted messages based on data in the intercepted messages.

Retrieving and appending additional information to messages is advantageous for applications consuming the messages. Retrieving the additional information can be burdensome or require access permissions applications may not possess, thus retrieving the information ahead of time is beneficial to the consuming applications.

In a tenth possible implementation form of the apparatus according to the first aspect as such or to any possible implementation form the processor is configured to present each predicted user action as a pair comprising an action and an associated data.

Presentation as pairs of action and data makes it easy for a user to quickly understand and make use of each predicted user action.

According to a second aspect of the present invention the above and further objects and advantages are obtained by a method for a mobile computing device. The method includes hosting a set of one or more applications, receiving a message from a first application in the hosted set of one or more applications, wherein the received message indicates a user action. The method determines if the user action is in a predetermined set of user actions, and when the user action is in the predetermined set of user actions, creating an intercepted message comprising a copy of the received message. The received message is broadcast to one or more applications in the set of hosted applications that are configured to receive the intercepted message.

In a first possible implementation form of the method according to the second aspect the method includes receiving one or more intercepted messages from the mobile computing device and reading sensor data corresponding to the one or more received intercepted messages, wherein the sensor data comprises at least one of a timestamp and a location. The method determines context information based on the received one or more intercepted messages and the sensor data, and appends the context information to the one or more received intercepted messages.

In a second possible implementation form of the method according to the second aspect as such or to the first possible implementation form of the second aspect the method comprises determining, using a random indexing algorithm, a set of predicted user actions based on the context information and the one or more received intercepted messages.

According to a third aspect of the present invention the above and further objects and advantages are obtained by a computer program comprising computer program instructions that when executed by a processor cause the processor to perform the method according to the second aspect of the present invention as such or to any of the first or second possible implementation forms of the second aspect.

These and other aspects, implementation forms, and advantages of the exemplary embodiments will become apparent from the embodiments described below considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

The methods and apparatus disclosed herein provide an improved user experience for users of mobile computing devices by incorporating a level of activity awareness into software programs running on these devices. By making mobile software smarter and more intelligent and building in an awareness of a user's virtual as well as physical activities, the mobile software can present the user with personalized services tailored to suite their activities, tasks, and needs. Such personalization relies on having a generic mechanism to detect, intercept, and classify, a mobile user's virtual activities.

The activities of a mobile user, i.e. the things the user of a mobile device does, can be considered as being of two basic types: physical activities, and virtual activities. Physical activities are things a human does outside the mobile computing environment such as running, walking, driving, and eating. Physical activities can be inferred through information derived from sensors or other interfaces accessible in the mobile device such as a global positioning system (GPS), accelerometer, clock, thermometer, wireless interface, etc. Virtual activities are things a mobile user does within the mobile computing environment by interacting with applications running the device. Virtual activities include activities such as reading emails, sending text messages, browsing the web, posting to social media and making phone calls.

Figure 1:
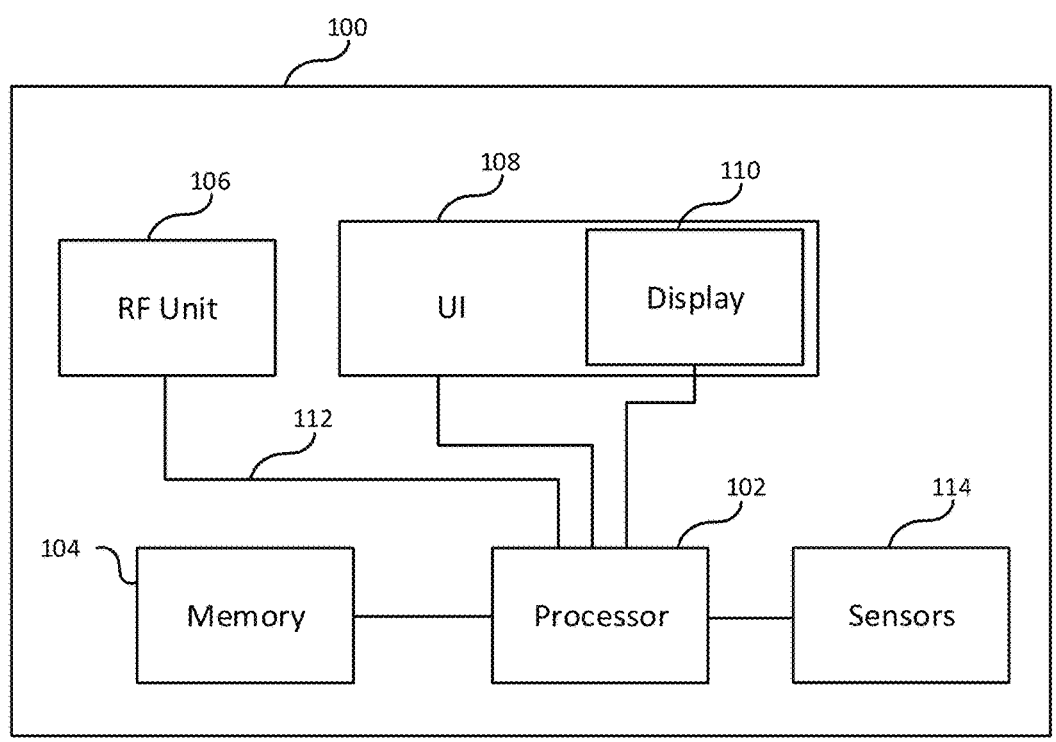
FIG. 1 illustrates a block diagram of a mobile computing device appropriate for practicing embodiments of the present invention.

FIG. 1 illustrates a block diagram of a mobile computing device 100 appropriate for implementing embodiments of the present disclosure. The illustrated mobile computing device 100 according to an embodiment of the present invention includes a processor 102 coupled to a computer memory 104, a radio frequency (RF) unit 106, a UI 108, a display 110, and sensors 114. The apparatus 100 is appropriate for use as a mobile computing device which may be any of various types of wireless communications user equipment including cell phones, smart phones and tablet devices.

The processor 102 may be a single processing device or may comprise a plurality of processing devices including special purpose devices, such as for example, digital signal processing (DSP) devices, microprocessors, specialized processing devices or general purpose computer processors.

The processor 102 is coupled 112 to a memory 104 which may be a combination of various types of volatile and non-volatile computer memory such as for example read only memory (ROM), random access memory (RAM), magnetic or optical disk, or other types of computer memory. The memory 104 stores computer program instructions that may be accessed and executed by the processor 102 to cause the processor to perform a variety of desirable computer implemented processes or methods.

The program instructions stored in memory 104 are organized as sets or groups of program instructions referred to in the industry with various terms such as programs, software components, software modules, units, etc., where each program may be of a recognized type such as an operating system, an application, a device driver, or other conventionally recognized type of software component. Also included in the memory 104 are program data and data files which are stored and processed by the computer program instructions.

The RF Unit 106 is coupled to the processor 102 and configured to transmit and receive RF signals based on digital data 112 exchanged with the processor 102. The RF Unit 106 is configured to transmit and receive radio signals that may conform to one or more of the wireless communication standards in use today, such as for example Long Term Evolution (LTE) and LTE-Advanced (LTE-A) developed by the third generation partnership project (3GPP), Wireless Fidelity (Wi-Fi) based on the institute of electrical and electronics engineers (IEEE) 802.11 standards, as well as many others. In certain embodiments, the RF Unit 106 includes receivers capable of receiving and interpreting messages sent from satellites in the GPS and work together with information received from other transmitters to obtain positioning information pertaining to the location of the device 100.

The mobile device 100 includes sensors 114 coupled to the processor 102 to provide additional context information that may be used by the processor 102 to enhance activity awareness. The sensors 114 may include for example an accelerometer, a clock, thermometer, as well as other sensors that may be used to enhance both physical and virtual activity awareness.

The UI 108 may include one or more user interface elements such as a touch screen, keypad, buttons, voice command processor, as well as other elements adapted for exchanging information with a user. The UI 108 may also include a display unit 110 configured to display a variety of information appropriate for a mobile computing device or mobile user equipment and may be implemented using any appropriate display type such as for example organic light emitting diodes (OLED), liquid crystal display (LCD), as well as less complex elements such as light emitting diodes (LEDs) or indicator lamps. In certain embodiments the display unit 110 incorporates a touch screen for receiving information from the user of the mobile computing device 100. The mobile computing device 100 described above and illustrated in FIG. 1 is appropriate for implementing any of the apparatus and methods disclosed herein. Especially may the processor 102 be configured to perform the methods described in the foregoing and the following.

Figure 2:
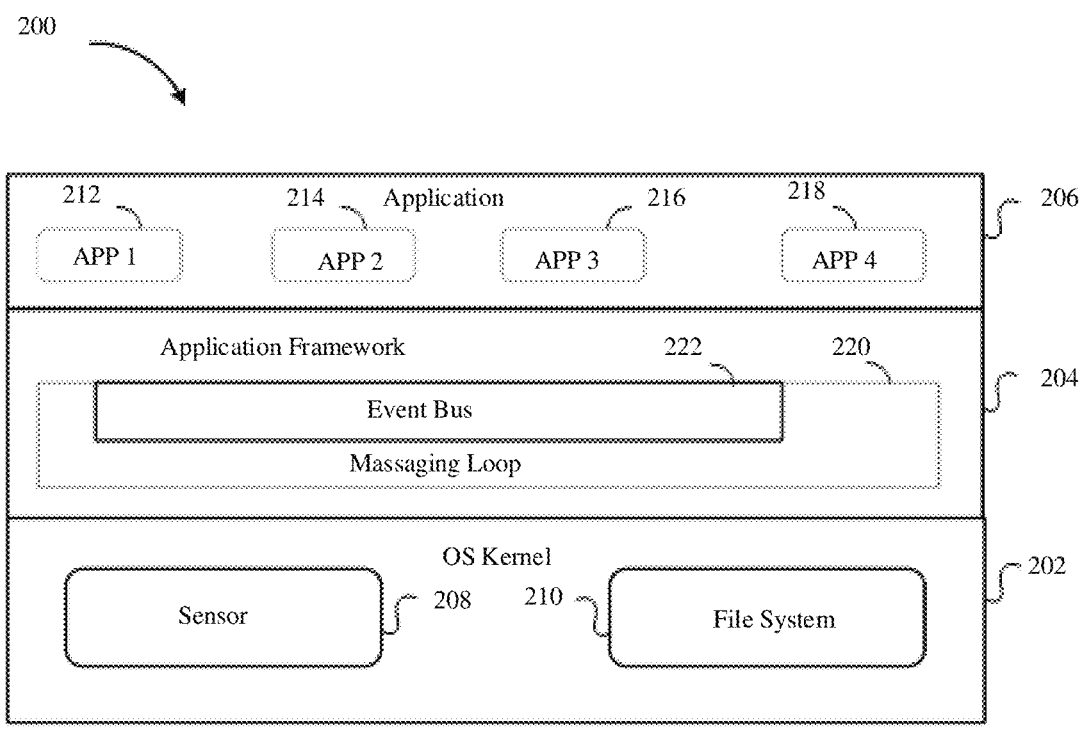
FIG. 2 illustrates block diagram of an operating system for a mobile computing device incorporating aspects of the disclosed embodiments.

FIG. 2 illustrates a block diagram representation of software components in a mobile operating system 200 as may be used by the mobile device 100 described above. In general, a mobile operating system 200 can be viewed as having three layers of abstraction as illustrated in FIG. 2. At the lowest layer, i.e. the layer communicating directly with the hardware of the mobile computing device 100 is the kernel 202. The kernel manages input and output requests from program components and connects programs to the hardware of the mobile computing device. For example the kernel 202 may include device drivers or other program modules to allow software components running on a mobile computing device 100 (e.g. on the processor 102 of the mobile device 100) to access sensors 208 or a file system 210, as well as other hardware apparatus included in the mobile computing device 100.

The application framework 204 layer, also referred to as an application framework, is a software framework or set of program instructions that supports creation and execution of standardized structured applications. The application framework 204 includes services and components used by application developers when creating applications that will run on the operating system 200. A hosted set of applications 212, 214, 216, 218 run at the application layer 206. Each application 212, 214, 216, 218 is hosted or runs in a separate process space or virtual machine such as for example, a JAVA VIRTUAL MACHINE (JVM), DALVIK VIRTUAL MACHINE, DOTNET runtime, or other appropriate process space, provided by the application framework 204. The process space hosts the application and protects each application 212, 214, 216, 218 from intrusion or corruption by other applications 212, 214, 216, 218 running on the same mobile operating system 200 and allows access to various services and functions provided by the application framework layer 204.

A key purpose of the application layer 206 and application framework layer 204 is to prevent an application from corrupting other applications or the operating system and to prevent applications from accessing information for which they do not have permissions. It is also desirable to present the user with a seamless experience among the various applications running on the mobile device 100. To achieve these goals, the mobile operating system 200 provides a mechanism for IPCs 220 enabling messages to be passed in a safe and controlled fashion between applications or between applications and the operating system. It is common practice to view the IPC mechanism 220 as part of the application framework layer 204 as illustrated in FIG. 2. Alternatively the IPC mechanism 220 may be considered along with other layers 202, 204, 206 in the mobile operating system 200. For purposes herein the IPC mechanism 220 is part of the mobile operating system 200 and those skilled in the art will recognize that the IPC mechanism 200 may be included in any one or more of the operating system abstraction layers 202, 204, 206 without straying from the spirit and scope of the disclosed embodiments.

Including an IPC mechanism 220 in the mobile operating system 200 enables seamless communication and interoperability among applications at runtime even when the applications are designed and developed independently of one another. The IPC mechanism 220 may be designed in various ways. For example, the IPC mechanism 220 illustrated in FIG. 2 is based on a message loop. In the illustrated embodiment, a message being sent is placed in a message buffer 222. The message buffer 222 may be implemented as a queue, stack, prioritized buffer, or other appropriate message buffer 222 allowing messages to be temporarily stored while awaiting further processing or dispatching. A message loop, which is a programmatic loop having a set of program instructions that are executed repeatedly, retrieves messages from the buffer 222, typically in the order they were placed on the queue or based on message priority, and sends or dispatches the retrieved messages to one or more applications or system services. In certain embodiments, it is advantageous to have a plurality of message buffers 222 and a plurality of message loops servicing these message buffers 222.

Different operating systems may use different message loop designs. For example, APPLE's IOS sends the collected events to a central software component known as the Notification Center. This Notification Center is implemented using an observer and invocation design pattern. The observer and invocation design pattern is also used to implement message loops in the SAILFISH OS and QT an open source cross platform application framework. The ANDROID OS uses a publisher/subscriber design pattern for matching the message between the sender and receiver. In the observer/invocation pattern, the sender of a message maintains a list of its dependents, called observers, and notifies them automatically of any state changes, usually by calling one of their methods. The observer/invocation pattern is often used to implement a distributed event handling system. Irrespective of the particular design pattern used, the messaging loop functions as a broker between the message sender and the message receiver or receivers.

The ANDROID OS is a modern mobile operating system commonly used on conventional mobile computing devices. As an aid to understanding, certain aspects of the disclosed embodiments are described with respect to the ANDROID OS. However those skilled in the art will recognize that the aspects of the disclosed embodiments may be advantageously employed in other mobile operating systems without straying from the spirit and scope of the present disclosure.

The ANDROID OS is designed to be a component-based software system where each software component exposes a number of entry points, referred to as Activities, which perform various functions. In the ANDROID OS, an Activity is an application component that provides a screen on the UI 108 with which users can interact in order to perform a virtual activity, such as dial the phone, take a photo, send an email or view a map, among other things.

Each Activity is given a window in which to draw its user interface. The window typically fills the screen, but may be smaller than the screen and float on top of other windows. The activities of various applications collaborate with each other using a generic IPC mechanism 220 known as an Intent. An Intent is an IPC message used in the ANDROID OS to indicate an intention to perform or start an Activity.

Applications designed for mobile computing devices running the ANDROID OS can be classified into three major classes:
1. Standard applications are applications that ship with a mobile device as part of the ANDROID Open Source Project (AOSP). These applications typically provide content and action sharing such as contacts, short message service (SMS), and web browser. Because these applications all ship with a device and are developed together with the OS they can be modified to track and support user activities. However, this modification can be expensive and time consuming because it requires that the source code of all the AOSP applications be similarly modified.
2. Social networking applications. This type of application presents a valuable source of information about user activities and most social networking applications provide a SDK to support activity collection and analysis. However, it can be difficult and expensive to build and integrate services with the many SDKs available for the multitude of social networking applications available for today's mobile devices.
3. Generic applications are applications downloaded from an application provider via a centralized service, such as GOOGLE PLAY or another app store, or directly from the application provider. In general, these generic or third party applications can be used with content editing, sharing, viewing, or sending activities. These activity-level actions can be used to capture information about how a user is using these generic applications in their daily lives. However it is a difficult and expensive task to modify the source code of each and every generic application in a way that supports activity awareness.

Figure 3:
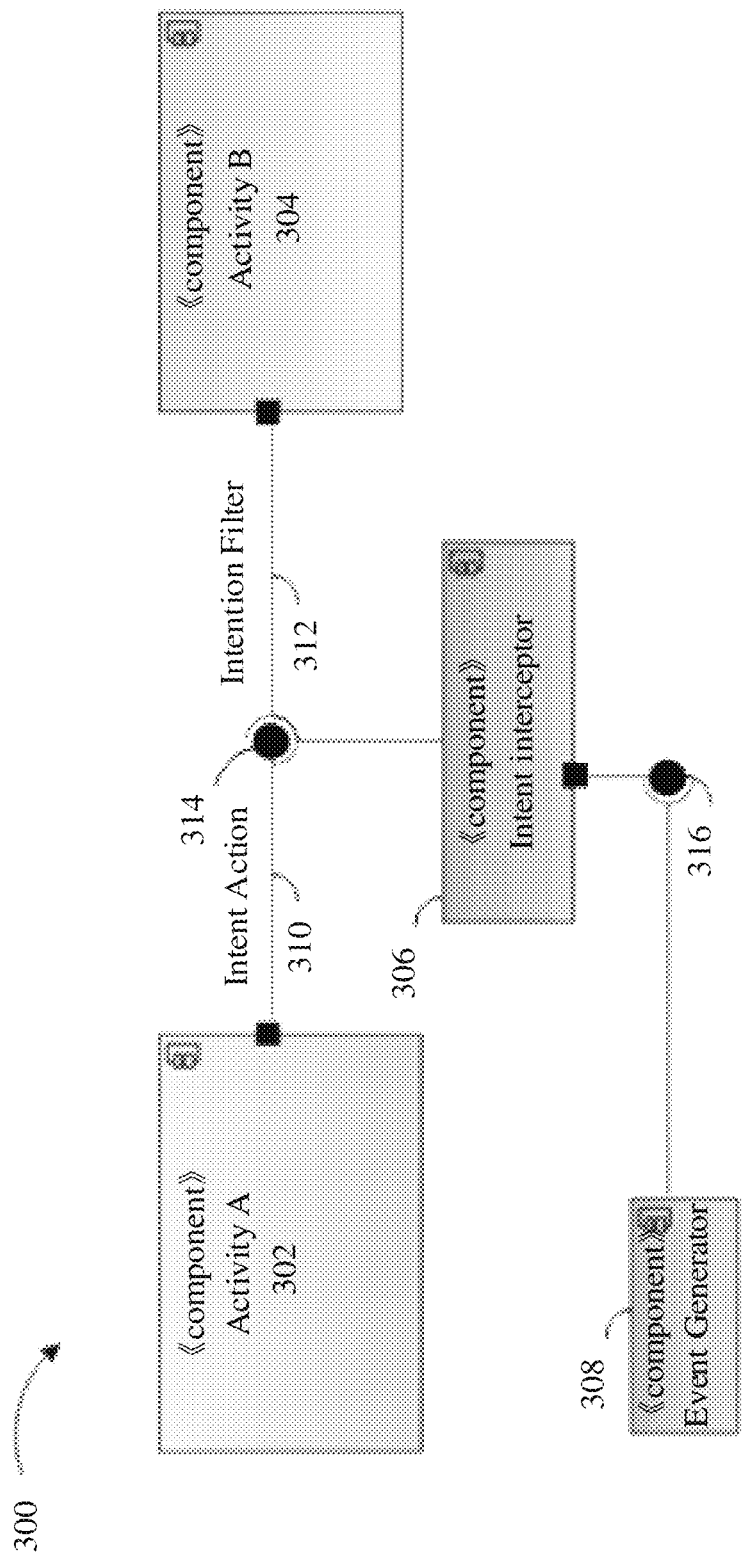
FIG. 3 illustrates a block diagram of a modified ANDROID Intent Inter-Process Communication (IPC) mechanism incorporating aspects of the disclosed embodiments.

FIG. 3 illustrates a block diagram of a modified ANDROID Intent IPC mechanism 300 incorporating aspects of the present disclosure according to an embodiment of the present invention. A message interceptor component 314 may be used to provide support for activity awareness without modifying each and every application running on the mobile device 100.

An Intent is a message, or IPC message, requesting that a particular activity or task be performed. The Intent contains information about a required action, including the type of action, the type of data included with the Intent, and information about the data, if any, being requested by the Intent sender. The Intent can be forwarded from one activity or component of an application to another activity in the same or a different application. For example the requested activity could be a request to open a web page, place a call, send a message to a person, or any actionable function, or Activity, which can be defined and included in an application by an application developer.

The interceptor mechanism 314 receives an Intent or message 310 from a sending application 302 requesting that an activity be performed. The interceptor mechanism 314 forwards the Intent 302 to one or more receiving applications 304 based on Intent filters 312 provided by the receiving applications 304. The intent filters 312 indicate to the interceptor mechanism 314 the types of Intents an application can handle.

In a typical mobile device the code of the sending application 302 would need to be modified to also send the Intent 310 to an activity awareness event generator component 308 in order to support activity awareness. This would however, require that all sending and/or receiving applications have their source code modified to support the event generator component.

According embodiments of the present invention, to avoid having to modify every application loaded onto a mobile computing device to support IPC message capture, the message interceptor component 314 is configured to intercept IPC messages at the operating system level instead of capturing messages at the application level.

In the example of FIG. 3 the message interceptor 314 is configured to intercept each Intent 310 being sent by an application 302 and make a copy. The copied Intent is reformatted as a set of key-value pairs to facilitate easy analysis by activity aware applications. Context information may also be added to the copied Intent to create an enhanced Intent and the enhanced Intent is tagged with a unique action to indicate it is a captured version of the original Intent 310. The captured Intent, also referred to herein as an intercepted intent or message 316 is then forwarded on to an event generation component 308. The event generation component 308 can forward or make the captured intent 316 available to any activity aware application or semantic service based on the action encoded into the original Intent 310 and/or the enhanced information contained in the captured Intent 316. The event generation component 308 identifies the captured Intent 316 by appending a predetermined category and a predetermined action. This allows any application desiring to receive captured Intents to register to receive messages having the predetermined category and predetermined action using an Intent filter 312. In general, all IPC mechanisms include or can be easily modified to dispatch IPC messages based on fields in the message and can therefore use the predetermined action and predetermined category fields to forward captured messages, such as the captured intents 316 to activity aware applications such as application 304.

Applications designed to run on the ANDROID OS include one or more activities and should define what type of Intents 310 each activity can send and/or receive using Intent filters 312. Specifying which Intents an application can process allows the message interceptor mechanism 314 to make decisions regarding delivery of an Intent 310. When more than one application is available to process the Intent 310, the user may be prompted to select which application they want to use to handle the Intent or alternatively the message interceptor mechanism 314 can send the Intent 310 to all applications 304 that have indicated they can handle the Intent.

For example an application can send an email message by generating an Intent with an action, or message action, of ACTION_SEND. The ANDROID OS then identifies all applications that can handle an Intent 310 with an action of ACTION_SEND based on the intent filters 312 provided by the installed applications. The OS can then forward the Intent 310 to all applications 304 that explicitly specify they can handle an ACTION_SEND type of Intent. Alternatively, the OS may display a list of the possible applications to the user and allow the user to select which application 304 to use.

In addition to the type of action, an application should also specify the type of data it can handle. For example, an application that can display text messages but not pictures should specify in the intent filter 312 both the action type and type of data it can handle in order to avoid receiving a type of data it cannot handle.

An ANDROID Intent may include the following information. It should be noted that other operating systems provide different IPC mechanisms using different but similar information that can also be advantageously employed by an IPC message interceptor mechanism as disclosed herein.

1. The name of a software component or activity that should be used to handle the Intent. In other words the message activity. This field is only used when the application sending the Intent wants to have a specific Activity handle the Intent.
2. The action, or message action, to be performed on the Intent. When monitoring user activities, some actions are more interesting than others. For example actions similar to ACTION_VIEW, ACTION_EDIT, or ACTION_SHARE all launch new virtual activities and are of interest when analyzing user activity, thus a message interceptor, such as the message interceptor mechanism 314 described above, can be configured to intercept message having these or other interesting types of actions. Actions that relate to an activity being performed by a user are referred to as activity level actions. Table 1 lists some activity level actions available in the ANDROID OS that may be of interest when analyzing virtual activities of a user. Other mobile OS may contain a different a different set of activity level actions that can be intercepted by IPC message interceptors designed for those mobile OS. In embodiments designed for another type of mobile OS a different set of interesting actions may be advantageously employed. In Table 1 the first column provides the name of the action, the second column provides the ANDROID constant associated with the action, and the third column provides a brief description of one purpose of the action.
3. Data type or message data type. This is the type of data associated with the Intent. It may be, for example, a multipurpose internet mail extension (MIME) type describing the data contained in the Intent. The Data type can be provided explicitly or it can be derived from the data itself.
4. Data, or message data. This is the actual data, or a reference to the actual data, contained in the Intent. The data may contain information about a phone number, a web uniform resource locator (URL) or web address, image, email attachment, or any other data the application, or user of the application, wishes to pass along with the Intent.
5. Extra Data. This is a bundle of any additional data provided by the Intent message. Each field in the extra data may be used as a key-value pair for encoding different types of information such as for example a string, bundle, or binary data. This can be used to provide extended information useful when processing Intent. For example when the Intent is a request to send an email, the extra data can be used to provide a subject or an email body, etc.

TABLE 1

| Action | Constant | Purpose |
| --- | --- | --- |
| ACTION_MAIN | android.intent.action.MAIN | Informs the context manager about the main activity of an application |
| ACTION_VIEW | android.intent.action.VIEW | A user is viewing an activity or a fragment of data. |
| ACTION_EDIT | android.intent.action.EDIT | A user is editing a fragment of data. |
| ACTION_PICK | android.intent.action.PICK | The user is trying to pick date/time from a selector or a list view component. |
| ACTION_CHOOSER | android.intent.action. CHOOSER | This action ask the user to select an application to execute a specific action. |
| ACTION_SENDTO | android.intent.action. SENDTO | This action is used when the user wish to send message to Person |

TABLE 1-continued

| Action | Constant | Purpose |
| --- | --- | --- |
| ACTION_ANSWER | android.intent.action.ANSWER | An action to tell that the user is about answering an incoming call |
| ACTION_ATTACH_DATA | android.intent.action.ATTACH_DATA | The user is asked to attach a file (i.e. image) |
| ACTION_RUN | android.intent.action.RUN | The Application is asking for another activity to run a specific data |
| ACTION_PICK_ACTIVITY | android.intent.action.PICK_ACTIVITY | An activity is asking the user to pick another Activity to complete an action. |
| ACTIVITY_SEARCH | android.intent.action.SEARCH | This action is used to perform a search query. This deal with default search engine in ANDROID (i.e. GOOGLE now) |
| ACTIVITY_WEB_SEARCH | android.intent.action.WEB_SEARCH | This action is used to perform a web search using the default search engine. |

As a user navigates through, out of, and back into an Activity or software component running on a mobile device, the Activity instances in the application transition between different states in their lifecycle. For instance, when an Activity starts for the first time, it comes to the foreground of the system and receives user focus. During this process, the ANDROID OS calls a series of lifecycle methods on the activity in which the activity sets up the user interface and other components. If the user performs an action that starts another activity or switches to another application, the system calls another set of lifecycle methods on the activity as it moves into the background (where the activity is no longer visible, but the instance and its state remains intact).

Figure 4:
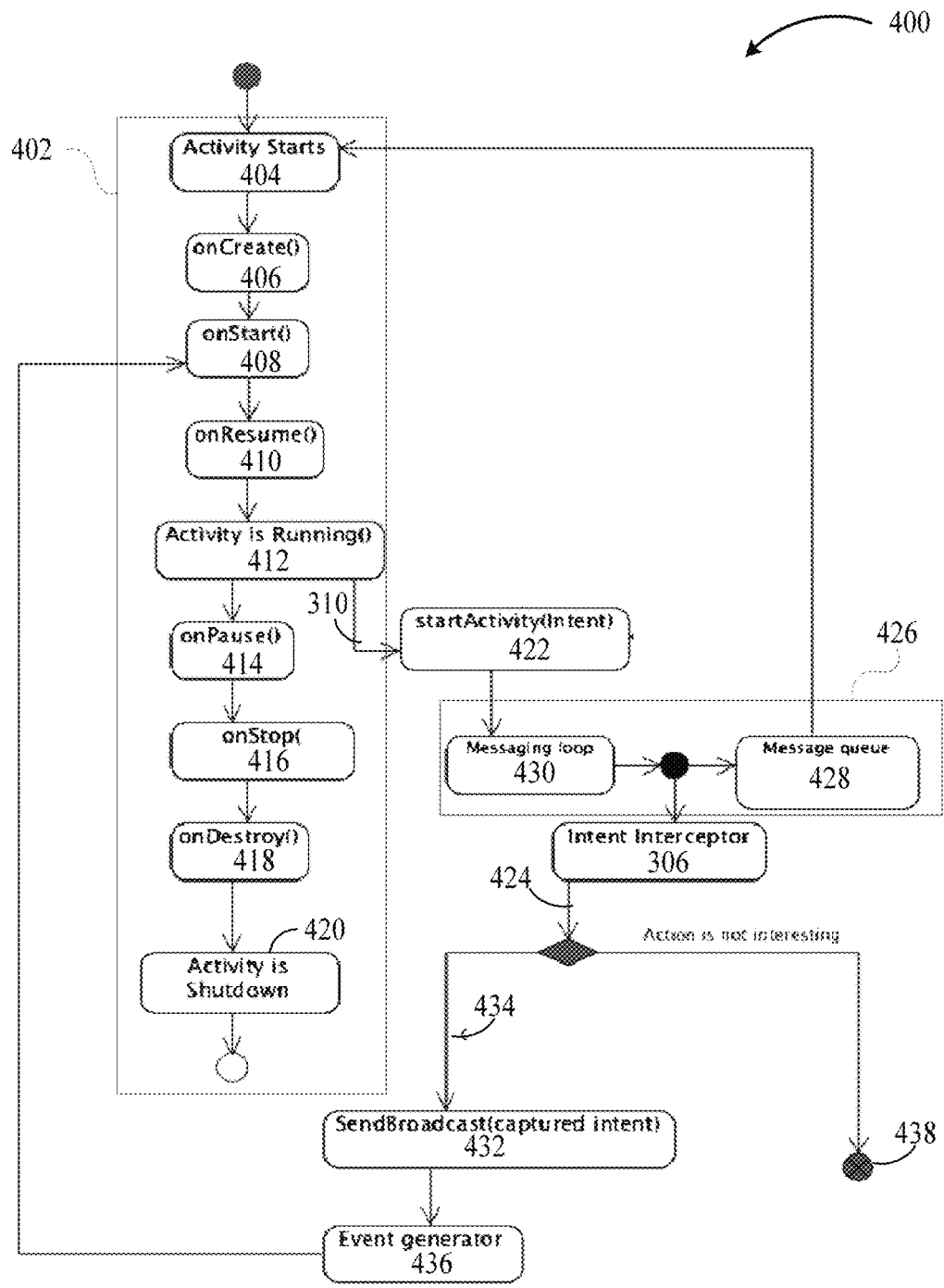
FIG. 4 illustrates a diagram of an enhanced Activity lifecycle incorporating aspects of the disclosed embodiments.

FIG. 4 illustrates a diagram, or state transitions, of an enhanced Activity lifecycle 400, for an Activity running on the ANDROID OS according to an embodiment of the present invention. The basic ANDROID Activity lifecycle 402 is shown on the left and begins when an Activity starts 404. Once an Activity starts 404, lifecycle methods onCreate 406, onStart 408, and onResume 410 may be called by the application framework 204 shown in FIG. 2 to move the Activity into the running state 412. Once an Activity is running 412 several more lifecycle methods may be called, onPause 414, onStop 416, and onDestroy 418 may be called to move the activity into the background or the shutdown state 420. Along with the illustrated state transitions other state transitions are also possible in the ANDROID Activity lifecycle.

While an Activity is in the running state 412 the user may perform an operation that results in generating an Intent 310 as shown in FIG. 3. Generating an Intent 310 starts an Activity 422 which forwards the generated Intent 310 to the IPC mechanism 426, which in the case of an ANDROID OS includes a message loop 430 and a message queue 428 as described above. In the presently disclosed embodiments, the IPC mechanism 426 has been enhanced to include an Intent interceptor 306 that intercepts the Intent 310 and checks its action against a predetermined set of interesting actions, such as the activity level actions shown in Table 1. For example any Intent with an action that starts a new activity may be considered interesting. When the Intent 310 is not considered interesting the Intent Interceptor 306 stops processing 438 on the Intent 310.

When the Intent 310 is considered interesting, i.e. the action is present in a pre-determined list of interesting actions, a copy 424 of the Intent 310 is made before the IPC mechanism 426 continues processing or dispatching the Intent 310. The captured Intent 424 is reformatted and additional information such as context information is added to the captured Intent 424. The captured Intent 424 is forwarded to a broadcast mechanism that will broadcast 432 the captured intent 424 to an event generator component which will send 436 the captured intent 434 to applications that have indicated they are interested in receiving the captured intent 424. The captured intent 424 can be encoded with a predefined action to uniquely identify the Intent 424 as a captured intent. An application desiring to track user actions can indicate with an intent filter 312 that the application wishes to receive the captured intent 424.

The captured Intent 424 organizes the collected Intent data as a set of key-value pairs to make it easy for applications consuming the captured Intents 424 to have direct access to the captured information. Each captured Intent 424 organizes the data captured from the intercepted intent 310 into the following fields:

1) A capturedData field containing information about the intercepted Intent 310 data, this can be a website URL, Phone number, email, etc.;
2) A capturedAction field containing information about the action in the intercepted Intent 310 such as android.intent.action.VIEW, android.intent.action.SENDTO, android.intent.action.DIAL, or other appropriate action;
3) A capturedType field providing information about the intercepted intent type. This field specifies an explicit type, such as a MIME type, of the intent data;
4) A capturedPackage field providing the name of the package that generated the intercepted intent; and,
5) A capturedComponentName providing the name of the Activity that triggered the intercepted Intent.

Based on the action of the intercepted Intent 310 the message interceptor 306 will copy or discard the intercepted intent 310. A predefined list of interesting actions, such as the actions shown in Table 1, can be used to determine whether the intercepted intent 310 is copied or discarded. The event generator 436 identifies the following information from the copy 424 of the intercepted intent 310:

1) Target component or activity,
2) Action, such as View, Pick, Call, Send, etc.,
3) Intent sender, this is the activity where the user triggered the intent,
4) Data Type,
5) Data—this is the actual data or message content,
6) Extra Data.

Applications downloaded to mobile computing devices from online services, such as GOOGLE PLAY or the APP STORE, can be readily monitored using the embodiments disclosed herein. These applications provide a good source of data regarding a user's virtual activities. In addition, downloaded applications can provide a rich source of information about the user's calendar events, call activities, SMS usage, and email content, which can be analyzed to capture more valuable information such as incoming and outgoing phone numbers, SMS receiver phone number and SMS content, Uniform Resource Locators (URLs) visited, and calendar events found in email content.

Figure 5:
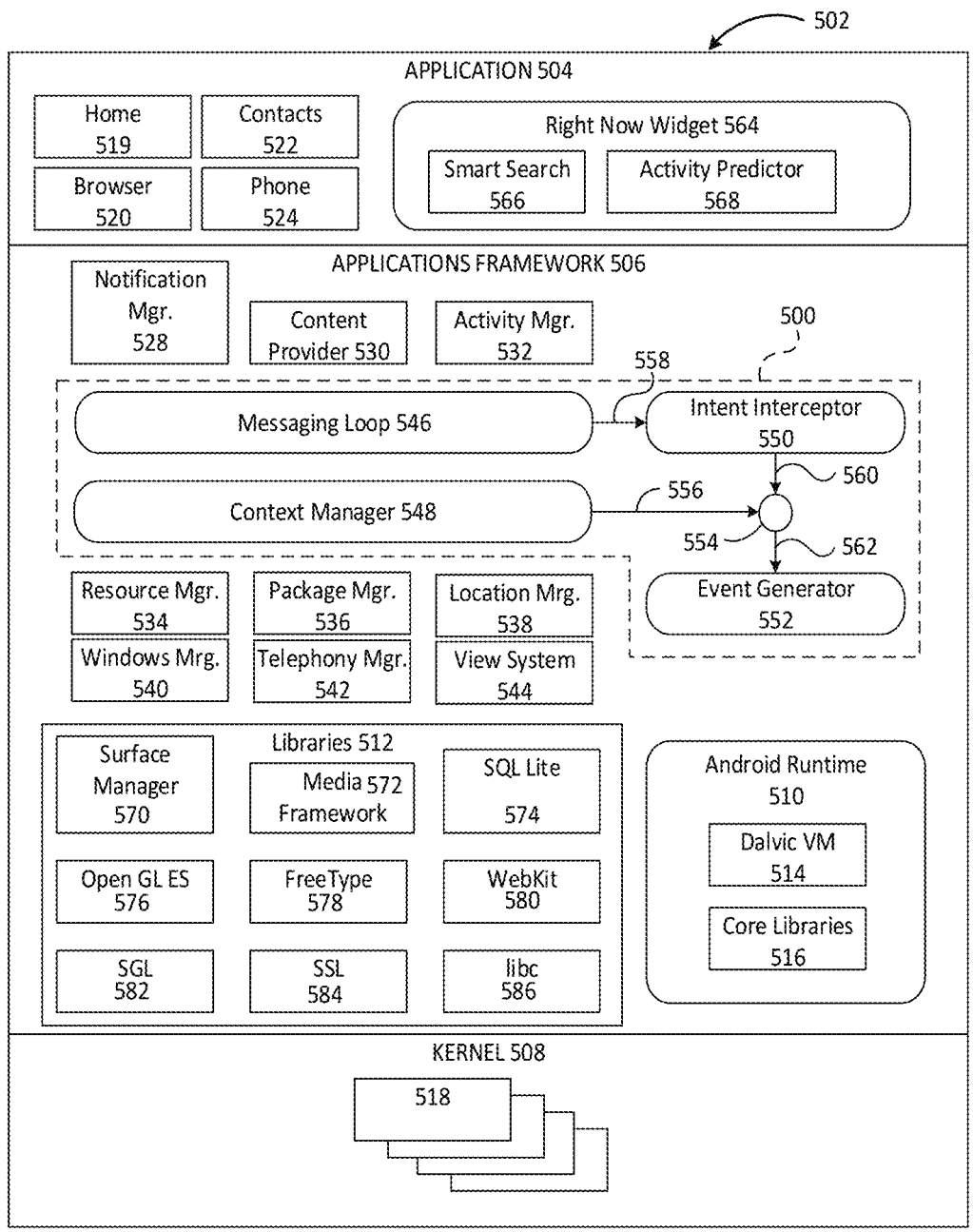
FIG. 5 illustrates a block diagram of an exemplary embodiment of an IPC message interceptor implementation incorporating aspects of the present disclosure.

FIG. 5 illustrates a block diagram of an exemplary embodiment of an IPC message interceptor implementation 500, as it may be implemented in an ANDROID type mobile operating system generally indicated by numeral 502. The ANDROID type operating system 502 conforms to the ANDROID design specifications published by GOOGLE Incorporated and may be any of the various released versions such as for example Version 4.4 released on Oct. 31, 2013 or Version 5.0 released on Nov. 3, 2014, or any other officially released version of the ANDROID operating system, which is hereby incorporated by reference in its entirety.

As illustrated in FIG. 5 the ANDROID OS 502 includes a set of libraries 512 that may be accessed through the applications framework layer 506. These libraries may include a Surface Manager 570 used to compose windows on the display or screen, Media Framework 572 used to process video and audio input and output, Open Graphics Library (OpenGL) Embedded Systems (ES) 576 that is a cross-platform graphics library, FREETYPE 578 that is a a font engine, WEBKIT 580 that is a library used for browsing the world wide web, structured query language (SQL) LITE 574 that is a SQL database engine, secure sockets library (SSL) 584 that is a SSL, saleable graphics library (SGL) 582 that is a SGL, and LIBC 586 also known as BIONIC which is a trimmed down UNIX-like C library, as well as other libraries that may be used by applications running on the ANDROID OS 502.

Applications running on the ANDROID OS 502 are run within the application layer 504 within their own an instance of the ANDROID Runtime 510. The ANDROID RUNTIME 510 includes a DALVIK Virtual machine 514 which is a sandbox environment used to protect other applications running on the mobile OS 502 as well as the mobile OS 502 itself from potentially harmful applications. Each instance of the ANDROID runtime 510 also contains a set of core libraries 516. The applications framework layer 506 runs on top of a LINUX type kernel layer 508 that includes a set of device drivers 518 that typically include a display driver, camera driver, flash memory driver, keypad driver, Wi-Fi driver, audio driver, and a power manager.

A standard set of applications is typically included on mobile devices that run the ANDROID OS 502 including a Home application 519 used to manage a user's home screens, a Browser application 520 used to browse the internet, a contacts application 522 used to manage a user's contacts, and a phone applications 524 used to make and receive phone calls.

Applications running at the applications layer 502 are supported by a set of software components or services in the applications framework layer 506 used to manage and support various capabilities of the applications layer 506. These capabilities and services include a Notification Manager 528, a Content Provider 530, an Activity Manger 532 used to manage the lifecycle of an activity such as the lifecycle described above and with reference to FIG. 4, a Resource Manager 534, a Package manager 536, a Location Manager 538, a Windows Manager 540, a Telephony Manager 542, and a View System 544, as well as other advantageous services and managers.

Conventional mobile operating systems, such as the ANDROID OS 502 illustrated in FIG. 5, include some form of IPC mechanism to allow applications running on the mobile operating system to collaborate with one another and to share their capabilities. Because each application is isolated within its own sandbox, such as an instance of the ANDROID Runtime 510 running in the application layer 504, an application cannot communicate directly with any other applications or with the operating system. The mobile operating system 502 therefore provides as part of the applications framework layer 506 or the kernel layer 508 an IPC mechanism that may be used by applications to exchange messages with other applications running in separate instances of the ANDROID Runtime 510 or to exchange messages with operating system services.

Collaboration between applications is done by having one application send an IPC message indicating its intention to use the capabilities of, or to have the user perform an activity within a different application. In the ANDROID OS 502 an IPC message may be referred to as Intent. The capability being accessed via the Intent is referred to as an Activity. It is also common for an application to send an IPC message even though the action can be handled within the same application. This is done so a user can use different applications to perform related activities based on their preferences. For example a user may like reading their emails in one email application but prefer to compose or edit emails in a different email application. Because well designed mobile applications send most of their interesting messages via the IPC mechanism rather than handling everything internally, it is possible to avoid the expense and difficulty of adding message capture capabilities to every application by implementing an IPC message interceptor mechanism within the operating systems IPC mechanism.

The mobile operating system 502 illustrated in FIG. 5 includes an IPC mechanism 500 that includes novel IPC message interception and broadcasting capabilities according to embodiments of the present invention which are similar to those described above. The messaging loop 546 is configured to intercept Intents sent by applications running in the applications layer 504 and forward the intercepted Intents 558 to an Intent Interceptor component 550. The Intent Interceptor 550 checks the action encoded into each intercepted Intent 558 against a pre-determined set of interesting actions, such as the set of activity level actions depicted in Table 1. If the action contained in the intercepted Intent 558 is determined to be interesting, the Intent Interceptor generates a captured Intent 560 populated with the information from the intercepted Intent 558.

The Intent Interceptor 550 is supported by a Context Manager 548 that provides context information 556 that is added 554 to the captured Intent 560. The content of the captured Intent 560 provides information about virtual actions performed by the user while the context information 556 provides information about physical activities and other sensor data occurring while the virtual activity is being performed. For example the sensor data may include a timestamp and a location, i.e. geographic location, allowing a user's velocity to be determined from the context information 556 included with a series of captured Intents 560. The captured Intent 560 is combined 554 with the context information 556 to form an enhanced Intent 562. The enhanced Intent 562 is passed to an Event Generator component 552 that reveals information of the enhanced Intent 562, and broadcast the enhanced Intent 562 to other applications desiring to receive captured Intents 560.

The Event Generator 552 reveals information of the enhanced Intent 562 and examines the usefulness of the information. For example, consider the following Intent information captured from WhatsApp. WhatsApp is a quick messaging application available for most mobile operating systems. The enhanced Intent 562 contains a SENDTO action and the following data:

"WhatsApp://android.intent.action.SENDTO\\com.whatsapp.Conversation/smsto:020 91556400". The Event Generator 552 reveals the underlying data of the enhanced Intent 562 by using the phone number to retrieve the actual message from the sent message box inside the SMS folder. The context of the message is retrieved and passed to a named entity recognition service which can extract the name, phone number, location, time and date, and/or subject name from the Intent information and the revealed data. Other types of captured messages can also be similarly enhanced by following the captured message data to reveal additional information.

For example a message that browses to a web page may contain only a URL. By retrieving the web page indicated by the URL, additional information derived from the web page can be added to the message.

The Context Manager 548 collects context information based on sensor data and abstracts the context conditions by describing the state of the context using natural language description. Each context condition is described with a finite set of natural language categories and the category for each context condition is determined by classifying context information including current and past sensor data as well as current and past enhanced Intents 562. For example a time of day context condition may be described using natural language categories such as morning, afternoon, evening, and night. The user's location context condition may be described by identifying their map region (i.e. zone), and in a similar manner, the user's physical activities context condition may also be described by natural language categories such as running, walking, driving, etc. Additional context condition may be included to describe, a user's virtual activities based on the virtual action being performed by the user such as calling, texting, viewing, editing, photographing, etc. Each context condition may be classified based on current and past sensor information as well as current and past intercepted messages. These natural language contextual concepts are attached 554 to the enhanced Intent 562 and passed to the Event Generator 552.

Figure 6:
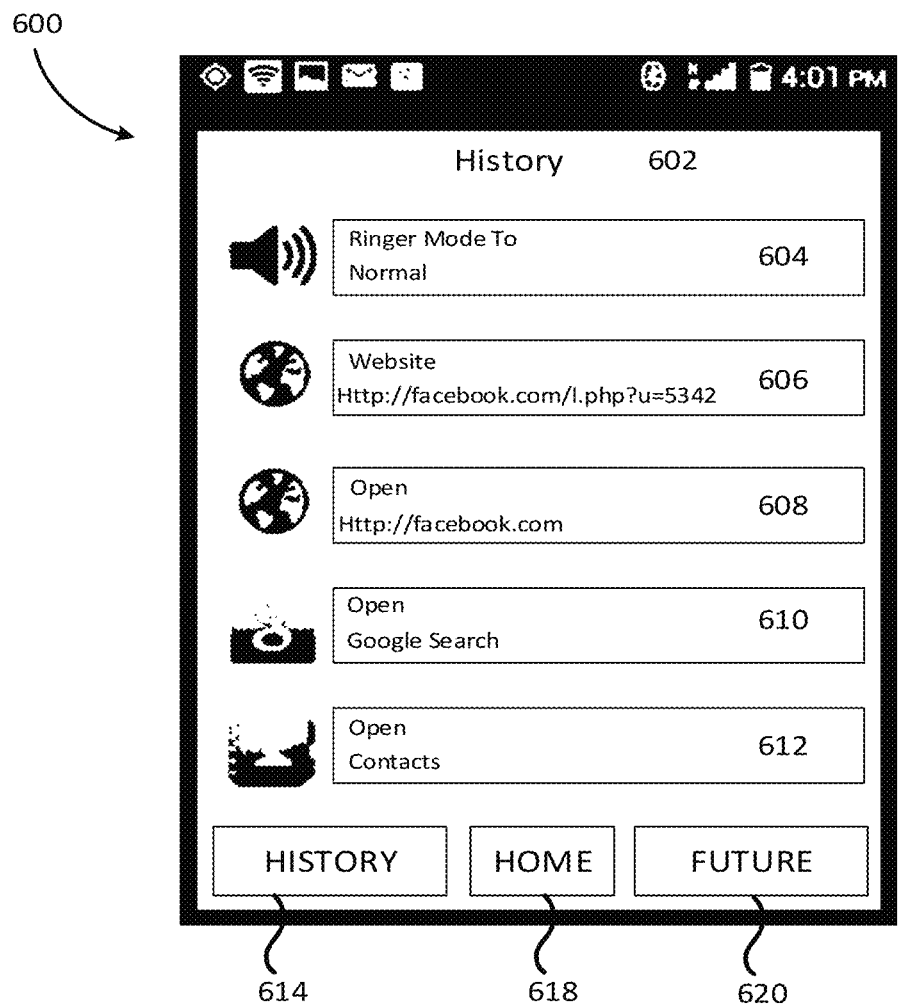
FIG. 6 illustrate a user interface of an exemplary application incorporating aspects of the present disclosure.
Figure 7:
FIG. 7 illustrates a user interface of an exemplary application incorporating aspects of the present disclosure.

FIGS. 6 and 7 illustrate a user interface 600 of an exemplary application incorporating aspects of the present disclosure. The user interface 600 can be incorporated in embodiments of the present invention. The exemplary application consumes captured IPC messages such as enhanced Intents 562 or other captured IPC messages, from a message interceptor, such as the message interceptor 500 described above or other appropriate message interceptor embodiment, and presents useful information to a user based on the captured IPC messages. The exemplary application collects all abstract concepts provided by the captured IPC messages, such as the enhanced Intents 562, which have been broadcast by a message interceptor 500. These captured concepts derive from three major sources: sensors data, physical activities, and virtual activities and are provided by the enhanced Intents 562. The information obtained from the captured IPC messages, such as enhanced Intents 562, is converted into a bag/set of concepts. The user interface 600 also included icon of HISTORY 614, HOME 618 and FUTURE 620.

For example, after categorizing the context information into a set of concepts that includes a set of categories such as at home, cooking, listing to radio, and normal. The captured IPC Messages are used to populate a history view or screen 602 as illustrated in FIG. 6 with those prior actions that are most pertinent, allowing a user to easily access historical actions that are likely of interest at the current time, (such as 604,606,608,610,612 in FIG. 6). A random index is used to perform similarity calculations among the set of concepts and provides a list of the most similar actions (i.e. predictions).

The list of likely next actions is provided to the user as a list of predictions 702 as illustrated in FIG. 7. Each item in either the history view 602 or the predictions view 702 is presented to the user as a pair of data along with its associated action. Presenting the history or predictions as a pair of data/action enables the user to navigate directly to another application such as a phone application, an SMS application, or a web browser, and have the associated data pre-populated in the target application. FIG. 7 included a set of predicted user actions 704,706,708,710,712.

A further outcome of the above described analytics is to identify a set of meaningful concepts from the captured IPC message content/context information. The identified concepts can be used with smart search applications, personalization applications or services, or a recommendation system of an application store. The identified concepts may also be integrated with the captured activity and used with a smart search query thereby providing search and voice recognition engines with a specific query based on the context of the user and their behavior rather than providing a large number of search results obtained using less specific queries.

An alternative embodiment of an application that consumes captured messages, such as messages 562 captured by the message interceptor 500, performs activity classification and feature extraction by processing the captured messages with a machine learning algorithm. The detected activities can be classified under a set of time periods in a single day such as morning, afternoon, evening, and night. All the captured activities are classified under each designated time period, and for each time period the collected patterns are grouped into a bag of patterns where the bag of patterns describes the user's status and action. Some examples of a bag of patterns are: {outdoor, running, listening to audio, happy}, {at work, sitting, meeting, sad}, {at home, cooking, listening to radio, normal}, {at home, sitting, watching movie, sad}, {at work, sitting, writing email, happy}, and {at home, sleeping, watching documentary, unknown}.

In addition the intent interceptor 500 can be used with semantic analysis services to add enhanced and smart functionality to applications running on a mobile computing device. For example analyzing the data collected by the intent interceptor for identifying meaningful concepts like name, topic, time, date, and location. This information can for example be used to automatically add a new calendar event based on a conversation the user had with a friend in a social media application. When the intercepted messages indicate that a user purchased an airline ticket from an online web site and received a confirmation email, a calendar reminder can be automatically created with the flight information.

In an alternate embodiment a message interceptor can be integrated with a smart home environment. For example, the message interceptor 500 can be used for monitoring and analyzing behavior of an elderly person to detect abnormalities based on changes in their virtual and physical activities derived from complete information about their virtual activities such as phone calls, SMS, posts, tweets, and image sharing.

Messages captured by a message interceptor, such as the message interceptor 500, can be used to derive statistical information about the most used applications, most contacted people, and most visited features in a specific application. At a high level the information derived from captured messages can be used to gain an understanding of how users react or respond to different context and conversation topics. This understanding can be used to provide the user with dynamically generated suggestions based on their historical reactions and replies. With the meaningful data about a user's virtual behavior provided by the herein disclosed message interceptor, mobile applications can provide users with enhanced and improved functionality tailored to their individual needs and dynamically updated based on their current context.

Figure 8:
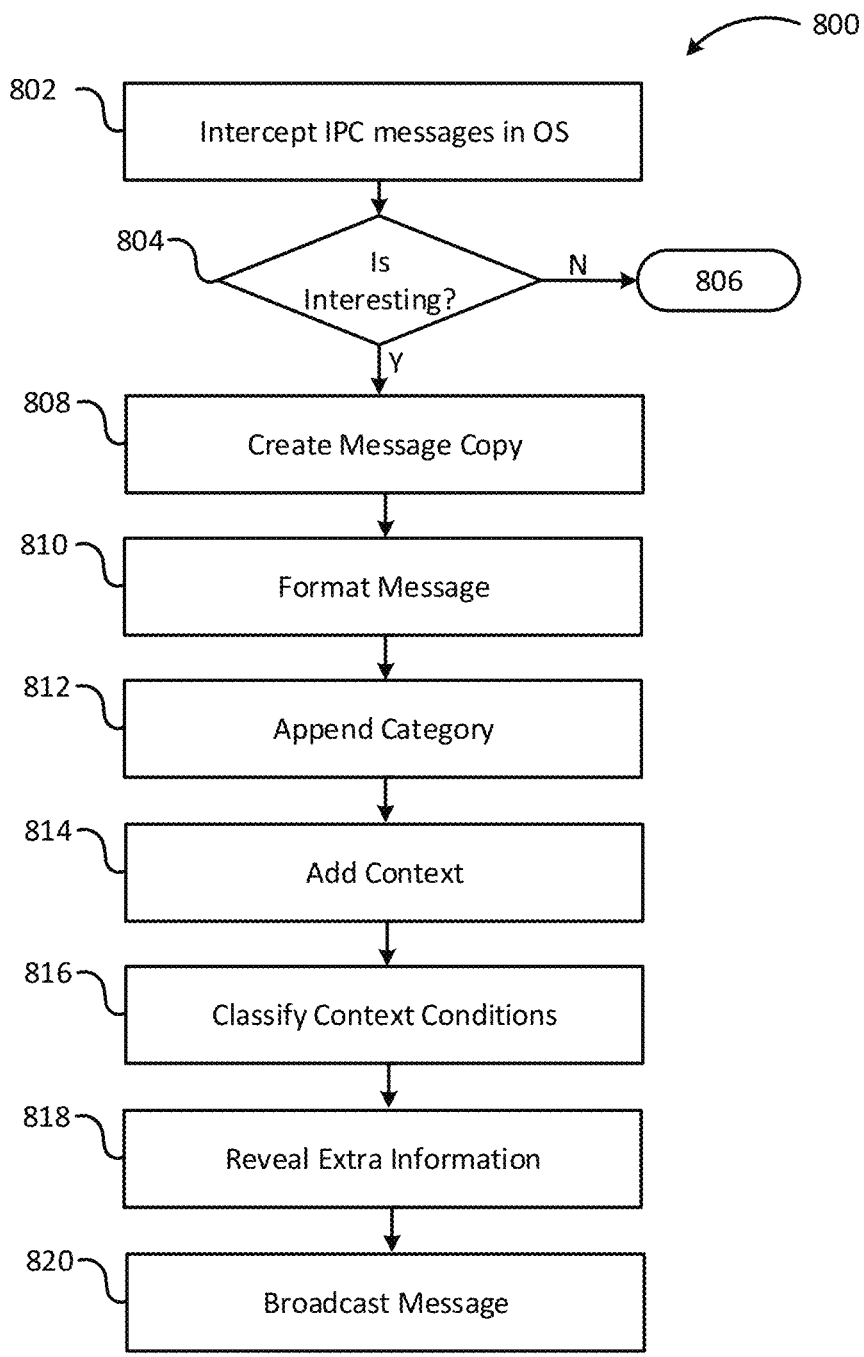
FIG. 8 illustrates a flow chart of a method according to an embodiment of the present invention.

FIG. 8 illustrates a flow chart of a (computer implementable) method 800 incorporating aspects of the present disclosure according to an embodiment of the present invention. The message interception method 800 is appropriate for implementation in embodiments of the present invention (e.g. in a mobile computing device such as the mobile computing device 100 described above). Applications, such as applications 212 or 302, running on a mobile operating system 200 often collaborate by sending IPC messages, such as an Intent 310, to other applications, such as applications 214 or 304, to make use of capabilities offered by those other applications 214, 304. Since applications 212, 214, 302, 304 run within a protected environment, such as the ANDROID runtime 510, these IPC messages are transferred between applications via an IPC mechanism 220 provided by the mobile operating system 200. The illustrated method 800 intercepts 802 these IPC messages, such as Intent type IPC message 310 described above, within the operating system IPC mechanism 220 thereby intercepting all IPC messages sent by any application without requiring any update to the program code of the sending application 214.

Once an IPC message has been intercepted 802 it is checked 804 to determine if it is interesting. When it is determined 804 that an intercepted message is not interesting the method 800 stops 806. An interesting IPC message is one that contains information useful for providing activity awareness capabilities. A message may be determined to be interesting based on its corresponding action or activity.

For example an ANDROID IPC message or Intent 310 includes an action encoded into the message that may be compared to a pre-determined list of interesting actions, such as the activity level actions illustrated in Table 1, and if the action is in the pre-determined list of interesting actions then a captured message is created 808 with a copy of the information in the intercepted message 802. The information may then be formatted 810 as a set of key-value pairs to facilitate easy access by an application or process receiving the captured message 808. A predetermined category is then encoded 812 into the captured message. This predetermined category may be included in the action field when the captured message is an ANDROID Intent. Alternatively the predetermined category can be encoded elsewhere in the captured message when incorporating a message interceptor method 800 into other mobile operating systems or to capture other types of IPC messages.

Context information is added 814 to the captured message. The context information includes sensor and other useful information to provide insight into how the mobile device is being used or what the user is doing. The context information may be enhanced based on current and past context information as well as current and past captured messages. This is done by adding one or more abstract context conditions to describe time, location, physical activity, virtual activity, or other context conditions useful when incorporating activity awareness into an application. A physical activity is an activity that a user may do such as running, walking, eating, or sleeping. A virtual activity is something a user does in the context of a mobile device such as texting, calling, or reading an email. The context conditions are described by classifying 816 each context condition into categories having natural language descriptions.

Time may be classified into a time period and may have imprecise boundaries. For example a time period may have categories such as morning, afternoon, evening, or night. The user location may be described by identifying a map region or zone. A map region may be a geographic area that has specific boundaries such as a country or imprecise or fuzzy boundaries such as the north-eastern portion of a country. Physical activities can be classified into categories such as running, walking, driving, or riding a bicycle.

The user virtual activities may also be classified into meaningful categories such as making a phone call, texting, viewing, editing, photographing, etc. Additional information may then be revealed 818 by based on data in the original message. For example, a caller's phone number found in a captured message can be used to access the user's contacts thereby revealing the caller's name, address, or other useful information about the caller that may then be added to the captured message. A URL found in a captured message may be used to access the associated web page which may then be analyzed to extract useful information that may be appended to the captured message. Similarly, other types of message data can be used to reveal 818 useful information to be included in captured messages. Once the captured message is complete it may be broadcast 820 to all applications desiring to receive captured messages.

Figure 9:
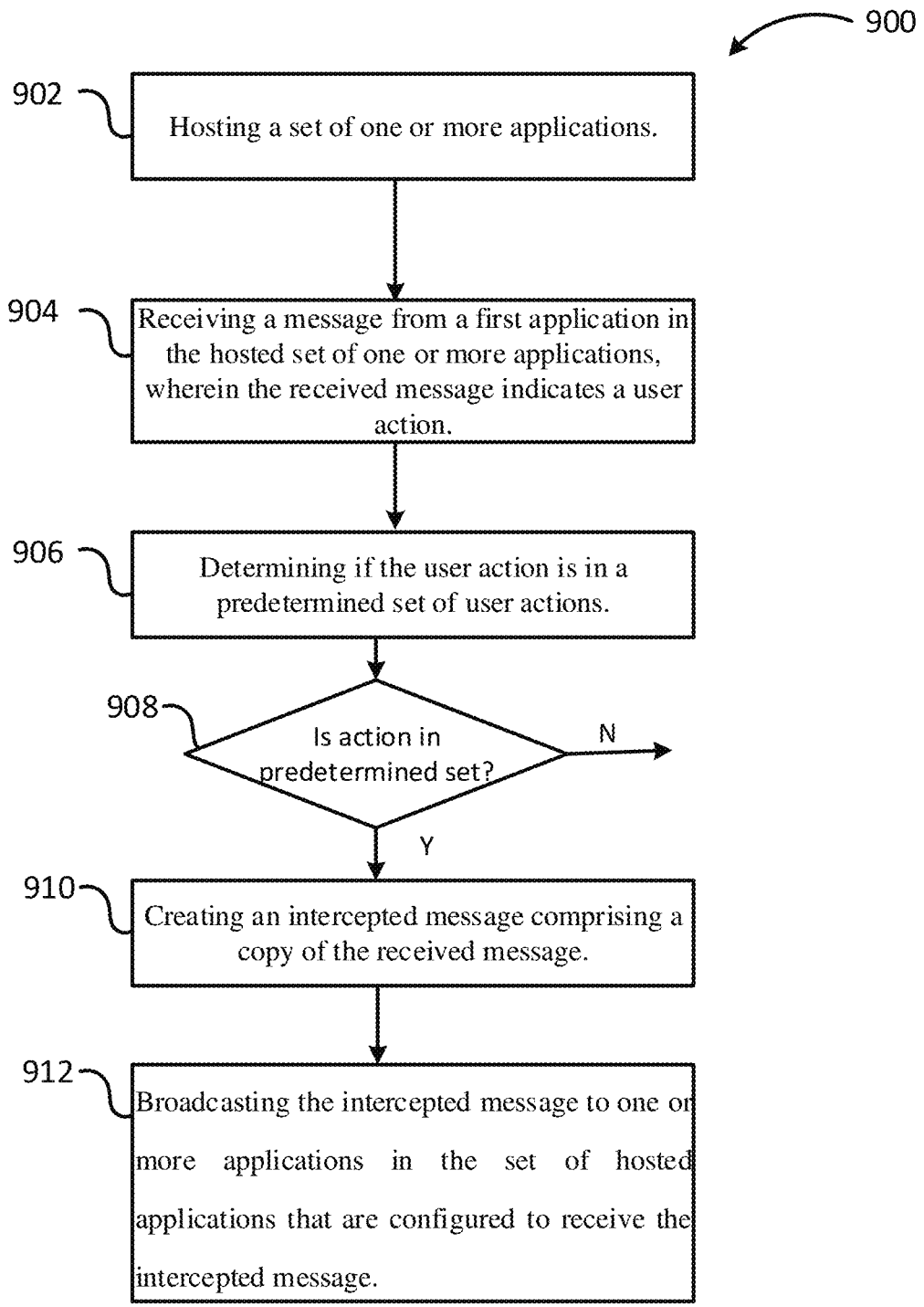
FIG. 9 shows a flow chart of a method for a mobile computing device according to an embodiment of the present invention.

FIG. 9 shows a flow diagram of a method 900 for a mobile computing device according to an embodiment of the present invention. The method 800 provides a possible implementation for the method 900. The method 900 comprises a step of hosting 902 a set of one or more applications 212, 214, 216, 218. Furthermore, the method 900 comprises a step of receiving 904 a message from a first application 212 in the hosted set of one or more applications 212, 214, 216, 218, wherein the received message indicates a user action. Furthermore, the method 900 comprises a step of determining 906 if the user action is in a predetermined set of user actions. When 908 the user action is in the predetermined set of user actions, an intercepted message 316 is created 910 comprising a copy of the received message 310. Furthermore, the method comprises a step of broadcasting 912 the intercepted message 316 to one or more applications 212, 214, 216, 218 in the set of hosted applications 212, 214, 216, 218 that are configured to receive the intercepted message 316 (i.e. are interested in the intercepted message 316).

According to further embodiments, the method 900 may comprise a step of receiving one or more intercepted messages 316 from the mobile computing device and a step of reading sensor data corresponding to the one or more received intercepted messages (316), wherein the sensor data comprises at least one of a timestamp and a location. Furthermore the method 900 may comprise a step of determining a context information 556 based on the received one or more intercepted messages 316 and the sensor data and step of appending the context information 556 to the one or more received intercepted messages 316.

According to further embodiments, the method 900 may comprise a step of determining, using a random indexing algorithm, a set of predicted user actions 704, 706, 708, 710, 712 based on the context information 556 and the one or more received intercepted messages 316.

The method 900 can be supplemented by any features of the apparatuses described herein in terms of method features.

Certain exemplary embodiments disclosed herein are illustrated with respect to a mobile computing device comprising the ANDROID operating system and IPC messages comprised of ANDROID type Intents, however it should be noted that the ANDROID operating system and ANDROID Intents are used as an aid to understanding only and the disclosed embodiments are not so limited. Those skilled in the art will readily recognize that an OS based message interceptor mechanism as disclosed herein may be advantageously employed in any mobile computing device running any mobile operating system that provides an IPC mechanism without straying from the spirit and scope of the disclosed embodiments.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
 a memory comprising instructions;
 a processor coupled to the memory and configured to execute the instructions, wherein the instructions cause the processor to:
  run a set of applications;
  receive a message from a first application in the set of applications, wherein the message indicates a user action;
  format the message as a set of key-value pairs to create an intercepted message comprising a copy of the message when the user action is in a predetermined set of user actions, wherein the set of key-value pairs comprises message data, message action, message data type, message sender, and message activity; and
  broadcast the intercepted message to at least one application of the set of applications that is configured to receive the intercepted message.

2. The apparatus of claim 1, wherein the instructions further cause the processor to be configured to append each of a predetermined category and a predetermined action to the intercepted message.

3. The apparatus of claim 1, wherein the instructions further cause the processor to be configured to append sensor data to the intercepted message, and wherein the sensor data comprises at least one of a timestamp or a location.

4. The apparatus of claim 1, wherein the memory comprises an operating system, and wherein the instructions further cause the processor to be configured to:
 receive a second intercepted message from the operating system;
 read sensor data corresponding to the second intercepted message, wherein the sensor data comprises at least one of a timestamp and a location;
 determine a context information based on the second intercepted message and the sensor data; and
 append the context information to the second intercepted message.

5. The apparatus of claim 4, wherein the context information comprises at least one of a time period, a map region, a physical activity, or a virtual activity.

6. The apparatus of claim 4, wherein the instructions further cause the processor to be configured to determine, using a random indexing algorithm, a set of predicted user actions based on the context information and the second intercepted message.

7. The apparatus of claim 4, wherein the context information comprises a context condition, wherein the context condition comprises a finite set of categories, and wherein the instructions further cause the processor to be configured to classify the context condition based on the sensor data and the second intercepted message.

8. The apparatus of claim 4, wherein the instructions further cause the processor to be configured to retrieve and append additional information to the second intercepted message based on data in the second intercepted message.

9. The apparatus of claim 6, wherein the instructions further cause the processor to be configured to present each of the set of predicted user actions as a pair comprising an action and an associated data.

10. A method implemented by a mobile computing device, wherein the method comprises:
 running a set of applications;
 receiving a message from a first application in the set of applications, wherein the message indicates a user action;
 formatting the message as a set of key-value pairs to create an intercepted message comprising a copy of the message when the user action is in a predetermined set of user actions, wherein the set of key-value pairs comprises message data, message action, message data type, message sender, and message activity; and
 broadcasting the intercepted message to at least one application of the set of applications that is configured to receive the intercepted message.

11. The method of claim 10, further comprising:
 receiving a second intercepted message from a mobile computing device;
 reading sensor data corresponding to the second intercepted message, wherein the sensor data comprises at least one of a timestamp and a location;
 determining a context information based on the second intercepted message and the sensor data; and
 appending the context information to the second intercepted message.

12. The method of claim 11, further comprising determining, using a random indexing algorithm, a set of predicted user actions based on the context information and the second intercepted message.

13. A non-transitory computer readable storage medium comprising instructions, which when executed by a processor, cause the processor to:
 run a set of applications;
 receive a message from a first application in the set of applications, wherein the message indicates a user action;
 format the message as a set of key-value pairs to create an intercepted message comprising a copy of the message when the user action is in a predetermined set of user actions, wherein the set of key-value pairs comprises message data, message action, message data type, message sender, and message activity; and
 broadcast the intercepted message to at least one application of the set of applications that is configured to receive the intercepted message.

14. The non-transitory computer readable storage medium of claim 13, wherein the instructions further cause the processor to:
 receive a second intercepted message from a mobile computing device;
 read sensor data corresponding to the second intercepted message, wherein the sensor data comprises at least one of a timestamp and a location;
 determine a context information based on the second intercepted message and the sensor data; and
 append the context information to the second intercepted message.

15. The non-transitory computer readable storage medium of claim 14, wherein the instructions further cause the processor to determine, using a random indexing algorithm, a set of predicted user actions based on the context information and the second intercepted message.

16. The method of claim 10, further comprising appending each of a predetermined category and a predetermined action to the intercepted message.

17. The method of claim 10, further comprising appending sensor data to the intercepted message, wherein the sensor data comprises at least one of a timestamp or a location.

18. The method of claim 11, wherein the context information comprises at least one of a time period, a map region, a physical activity, or a virtual activity.

19. The non-transitory computer readable storage medium of claim 13, wherein the instructions further cause the processor to append each of a predetermined category and a predetermined action to the intercepted message.

20. The non-transitory computer readable storage medium of claim 13, wherein the instructions further cause the processor to append sensor data to the intercepted message, wherein the sensor data comprises at least one of a timestamp or a location.

* * * * *